Dec. 2, 1969     H. C. POULTER     3,482,161

POWER-SATURATION SPECTROMETER

Filed Oct. 17, 1966

INVENTOR
HOWARD C. POULTER

BY    *A. C. Smith*

ATTORNEY

United States Patent Office 3,482,161
Patented Dec. 2, 1969

3,482,161
POWER-SATURATION SPECTROMETER
Howard C. Poulter, Palo Alto, Calif., assignor to Hewlett-Packard Company, Palo Alto, Calif., a corporation of California
Filed Oct. 17, 1966, Ser. No. 587,249
Int. Cl. G01r 27/04
U.S. Cl. 324—58.5                                  4 Claims

ABSTRACT OF THE DISCLOSURE

A microwave spectrometer utilizes the non-linearity of power saturation of the sample to provide the desired information about the sample under examination without the need for spectroscopic transition modulation by means of Stark or Zeeman modulation of a sample under examination.

---

It is another object of the present invention to provide an improved microwave spectrometer which obviates the need for Stark or Zeeman modulating fields.

In accordance with the illustrated embodiment of the present invention, the microwave carrier signal applied to the sample under examination is modulated to provide sidebands about the frequency of the carrier signal at power levels which are variable. The non-linearity of the power saturation effect of the sample under examination generates harmonics of the sidebands, a selected one of which is detected for maximum E field change as the relative power level is varied.

Figure 1:
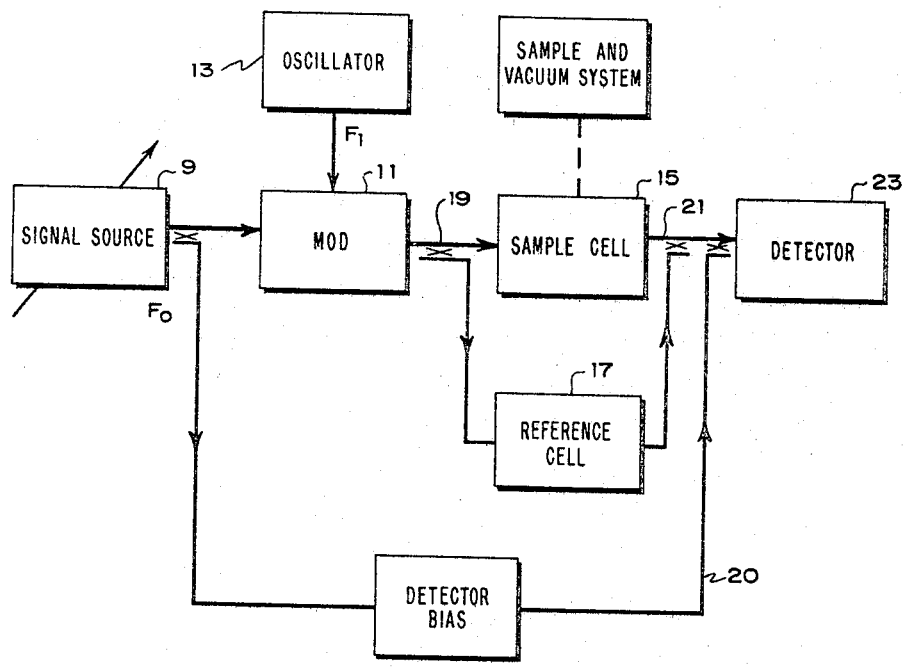
Figure 2:
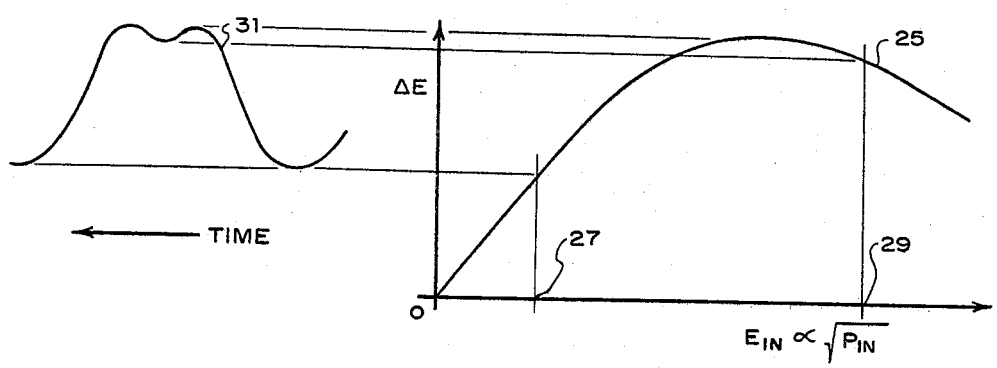

Other and incidental objects of the present invention will be apparent from a reading of this specification and an inspection of the accompanying drawing in which:

FIGURE 1 is a simplified schematic diagram of the spectrometer of the present invention; and FIGURE 2 is a graph showing the signal relationships in the spectrometer of FIGURE 1 operated in the power saturation region.

Referring to FIGURE 1, which shows a simplified schematic diagram of a spectrometer according to the present invention, the microwave signal from source 9 is modulated in modulator 11 by a low-frequency signal from oscillator 13. This modulated microwave carrier signal is applied to a sample under examination within the sample-holding cell 15 and is also applied to the reference cell 17 which is connected through directional couplers 19 and 21 to form an auxiliary signal path around the sample cell 15. The resultant of signals from the sample cell and reference cell combined in directional coupler 21 is then detected by detector 23.

In operation, signal source 9 supplies a microwave signal at frequency $F_0$ which is variable over a range of frequencies wherein a spectroscopic transition of the sample is expected to occur. This microwave signal is modulated by the low-frequency signal $F_1$ from oscillator 13 to provide upper and lower sidebands $F_1$ away from the carrier signal $F_0$. The modulated carrier signal having a carrier frequency which is substantially at the spectroscopic transition frequency is applied to the sample within the cell 15 with a power level which varies with time at the $F_1$ rate to excite the sample, over a range of power levels for which the power saturation characteristic of the sample is non-linear, as shown in the graph of FIGURE 2. The curve 25 of FIGURE 2 is a graph of field change due to electromagnetic energy absorption by the sample under examination as a function of applied signal power. Thus, as the applied signal power at the spectroscopic transition frequency varies substantially sinusoidally with time between the levels 27 and 29 at the frequency $F_1$ of the modulating signal, the non-linearity of power absorption by the sample under examination produces a distorted field-change signal with time, as shown by curve 31, which includes harmonics of the sideband frequency spacing $F_1$.

The auxiliary signal path including reference cell 19 and directional couplers 19 and 21 may include attenuators and phase shifters for applying the modulated carrier signal to the detector 23 in phase opposition to the signal transmitted through the sample cell 15. By suitably adjusting the amplitude and phase of the modulated signal transmitted through the auxiliary signal path, substantially the entire modulated signal transmitted through the sample cell 15 can be balanced out leaving a resultant signal for application to the detector 23. This resultant signal contains harmonics of the modulating signal $F_1$ with the carrier and first sidebands essentially cancelled. A detector bias signal path 20 is coupled to detector to supply power thereto at a selected level for optimizing operation of the detector 23. Thus, where the modulated signal has a carrier frequency which is not at or near the frequency of a spectroscopic transition in the sample, the power saturation characteristic of the sample under examination is substantially linear at the normal operating power levels and no harmonics of the modulating signal $F_1$ are generated. Detector 23 may also include a filter for selecting a particular harmonic of the modulating signal and for rejecting the modulating signal itself. Signal sensitivity derived from harmonic detection of the modulating signal is thus greatly improved. Additionally, the variation between power levels 27 and 29 at the frequency $F_1$ of the modulating signal and the value of power limit 29 may be chosen to produce a maximum field change in the detected harmonic of the modulating signal. Selected parameters of the sample under examination may thus be determined using techniques commonly described in the literature (see also, for example, U.S. patent application Ser. No. 528,854 filed on Feb. 21, 1966 by Poulter, Harrington and Bauhaus and owned by the assignee of this application) knowing the frequency of the carrier signal, the power level 29, and the range 27–29 of the power variations required to produce a maximum in the field change in the detected harmonic of the modulating signal.

For example, the amplitude of the signal out of the detector 23 is indicative of the amount present in a sample under test of a particular gas which has a spectroscopic transition at the frequency of the carrier signal. This detector output signal may also provide indications of the number of such gas molecules in the different vibrational states of the molecule, the kinetic energy transfer mechanism between molecules, and the like using known techniques commonly associated with the test results of Stark or Zeeman modulation.

I claim:
1. Apparatus for analyzing a sample of matter of the type in which a spectroscopic transition may be produced by the interaction of electromagnetic radiation with the sample, the apparatus comprising:
   a source of amplitude-modulated electromagnetic radiation signal including a sideband signal component spaced in frequency from a carrier signal component by a selected frequency value;
   a sample-holding cell coupled to said source for receiving the signal therefrom; and
   a signal detector responsive to signals at a harmonic of said selected frequency value and coupled to said sample-holding means for receiving the output signal therefrom, the change in the electromagnetic field component at said harmonic of said selected frequency value is substantially maximum at a selected power level of said carrier signal component and a selected ratio of the power levels of said carrier signal and sideband signal components.

2. Apparatus for analyzing a sample of matter of the type in which a spectroscopic transition may be produced by the interaction of electromagnetic radiation with the sample, the apparatus comprising:
- a source of electromagnetic radiation signal including a sideband signal component spaced in frequency from a carrier signal component by a selected frequency value;
- a sample-holding cell coupled to said source for receiving the signal therefrom;
- a signal detector responsive to signals at a harmonic of said selected frequency value and coupled to said sample-holding means for receiving the output signal therefrom; and
- an auxiliary signal path coupled to said source and to the output of said sample-holding cell for applying to said signal detector the combined signals from said auxiliary signal path and sample-holding cell for enhancing the level of the selected harmonic relative to the level of said modulated carrier.

3. Apparatus as in claim 2 wherein:
the signal detector has an optimum range of applied signal power for which the signal-to-noise ratio is a maximum, and comprising:
a bias signal path coupled to said signal detector for supplying bias signal thereto to alter the power level of the resultant signal applied to said signal detector to within said optimum range.

4. Apparatus as in claim 3 wherein:
said source of electromagnetic radiation signal includes a generator of carrier signal, a modulator and a generator of modulating signal; and
means connecting said generators to said modulator for producing said electromagnetic radiation signal at the output thereof as a modulation product of said carrier and modulating signals, and wherein:
said bias signal path is coupled between said generator of carrier signal and said signal detector for applying signal thereto with selected amplitude and phase relative to the resultant of signals applied to said signal detector for altering the power level of the signals applied to said signal detector to within said optimum range.

References Cited

UNITED STATES PATENTS

| | | |
|---|---|---|
| 2,637,767 | 5/1953 | Hershberger. |
| 2,670,011 | 8/1956 | Berry. |
| 3,032,712 | 5/1962 | Hurvitz _____ 324—57 |

RUDOLPH V. ROLINEC, Primary Examiner

P. F. WILLE, Assistant Examiner